Jan. 23, 1968     R. J. PATTERSON     3,364,600

SEQUENTIAL DIAGNOSIS AND INSTRUCTION DEVICE

Filed March 19, 1965

INVENTOR.
RICHARD J. PATTERSON
BY Naylor + Neal
ATTORNEYS

United States Patent Office 3,364,600
Patented Jan. 23, 1968

3,364,600
SEQUENTIAL DIAGNOSIS AND INSTRUCTION DEVICE
Richard J. Patterson, Eichler Central Towers, 350 Turk St., Apt. 812, San Francisco, Calif. 94102
Filed Mar. 19, 1965, Ser. No. 441,152
3 Claims. (Cl. 35—77)

ABSTRACT OF THE DISCLOSURE

A stand for the sequential display of diagnosis and instruction information comprising a rotatably mounted pyramidical body defined by a plurality of triangular surfaces disposed for selective viewing responsive to turning of the body. The surfaces are joined at a common upwardly disposed apex and information to be displayed is located on the surfaces so that the apex directs attention to the uppermost information on each surface.

---

Figure 1:
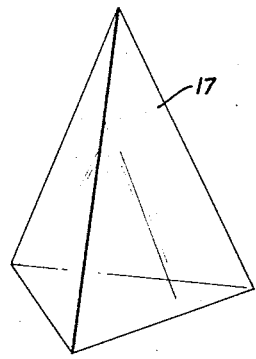
Figure 1:
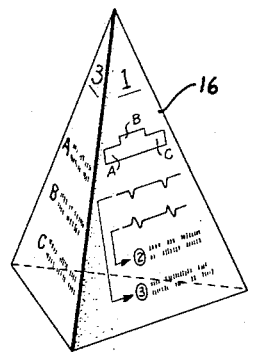
Figure 1:
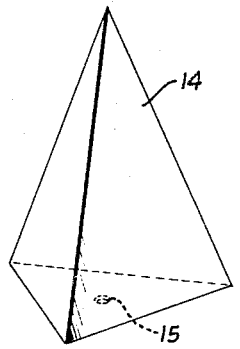
Figure 1:
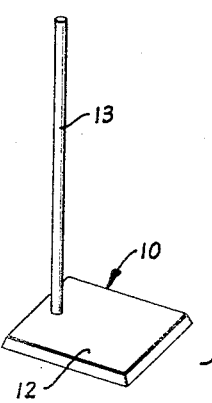

The present invention relates to a device for sequentially presenting diagnostic and corrective instruction information for use with heart restarting equipment. The device is especially concerned with the effective and rapid conveyance of this information to the operators of such equipment in cases where a patient's heart has unexpectedly stopped beating.

The heart restarting equipment for use with which the present invention is particularly designed is very complex and is used sufficiently rarely that there is frequently no person in attendance with a full knowledge of the equipment and the way it is to be used. Furthermore, when such equipment must be used, the operator is under very substantial time pressure, because the patient's heart must be restarted within approximately six minutes if very serious brain damage is to be avoided.

It is, accordingly, a principal object of the present invention to provide a device for rapidly conveying diagnostic and corrective instruction information to the operators of heart restarting equipment.

Another and more specific object of the invention is to provide such a device wherein information may be so organized that only the necessary parts thereof are quickly and efficiently conveyed to the operator of the equipment in a broken down stepwise manner corresponding to the steps required to operate said equipment.

Another object of the invention is to provide such a device which optimizes the use of available light and requires minimal handling by the operator.

A further object of the invention is to provide such a device which is adapted to contain sequence indicia in such a manner that observer attention will be directed thereto, thus assuring that instructive information will be conveyed in the proper sequence.

Still another object of the invention is to provide such a device having multiple faces on which sequence indicia and diagnostic and corrective instructive information may be displayed, which faces are adapted to be selectively presented to an observer in one at a time fashion.

Yet another object of the invention, related to the latter object, is to provide such a device wherein, when one face is presented to an observer for viewing, the remaining surfaces are out of the observer's view.

A further object of the invention is to provide such a device of durable and wear resistant construction, which is adapted to be readily changed to contain different sets of instruction information.

The basic structure of the present invention comprises a pyramidical body having a plurality of triangularly shaped outwardly facing surfaces joined at a common apex and a mount for movably supporting the body with the apex disposed at the upper extremity thereof whereby any one of said surfaces may be selectively positioned to face an observer. At least one of the surfaces of this structure is adapted to have disposed thereon diagnostic instructions making reference to alternative corrective instructions. The remaining surfaces are each adapted to have disposed thereon alternative corrective instructions to which the diagnostic instructions make reference.

Figure 2:
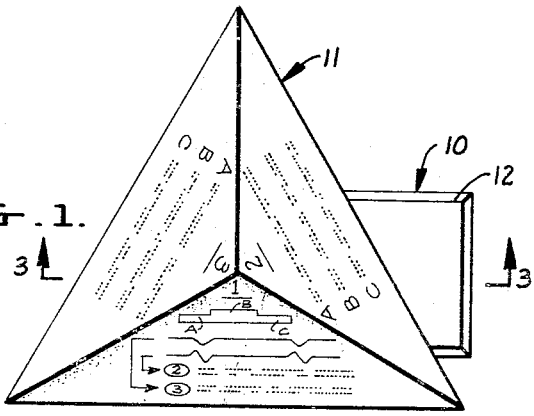
Figure 3:
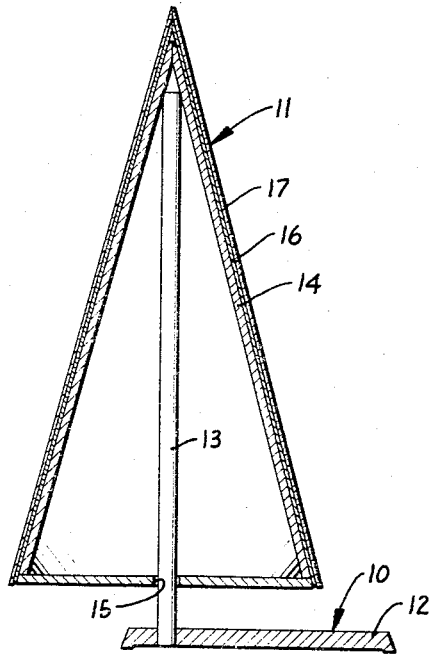

The detailed construction of the inventive device and the foregoing and other objects will become more apparent when viewed in light of the accompanying drawings, wherein:

FIG. 1 is an exploded perspective view of the device;
FIG. 2 is a plan view of the device; and
FIG. 3 is a sectional view taken on plane 3—3 of FIG. 2.

Referring now to the drawings in detail, the inventive structure shown therein basically comprises a supporting structure 10 having a pyramidical body 11 mounted thereon for pivotal movement about a vertical axis. The supporting structure 10 includes a weighted base structure 12 having fixedly secured thereto the lower end of a rod 13. The base member 12, as can be seen from FIG. 3, is adapted to maintain the rod is a vertically disposed position wherein it defines the vertical axis about which the body 11 is pivotally mounted.

The structure of the body 11 directly mounted on the supporting structure 10 comprises a hollow pyramidical shell 14 fabricated of rigid material, such as aluminum. The shell 14 is defined by three closed upper surfaces joined at a common apex and a lower surface having an opening 15 centrally disposed therein in vertical alignment with said common apex. The opening 15 has a diameter greater than that of the rod 13. Thus, as can be seen from FIG. 3, the rod 13 is adapted to be extended slidably through the opening 15 into pivotal bearing engagement with the upper interior surfaces of the shell 14. In the latter condition, the shell 14 is supported on the rod 13 for pivotal movement about the vertical axis defined thereby.

The structure of the body 11 is completed by a paper shell 16 removably received over the shell 14 and a transparent shell 17, of cellophane of the like, removably received over the shell 16. In the assembled condition, as illustrated in FIG. 3, the shell 16 is sandwiched between the shells 14 and 17 in a compactly mated arrangement. Thus, the shell 16 is supported on its inner surfaces by the shell 14 and protected on its outer surfaces by the shell 17.

The foregoing construction of the body 11 has the advantage that any desired indicia may be imprinted on the shell 16 through conventional and relatively inexpensive techniques. Ideally, this indicia is imprinted on the material of the shell 16 while it is in flat sheet form before being assembled into the pyramidical configuration. This construction also has the advantage that alternative shells 16 may be substituted, one for the other, without changing the shells 14 and 17.

Referring now to the particular indicia which is shown schematically imprinted on the shell 16 for the sake of illustration, this indicia takes the form found preferable for diagnostic and corrective instructions to be used with the aforementioned heart restarting equipment. Specifically, this includes sequence indicia in the form of the numerals 1, 2 and 3 on each of the respective sides of the shell 16 and instruction indicia disposed below the sequence indicia. It is noted that on each side of the shell the sequence indicia is located adjacent the common apex of the side and that, thus, attention of the observer is first drawn to this indicia. Below the sequence indicia 1, diagnostic indicia is imprinted including: an illustration of the equipment being used and the controls therefor; oscilloscope patterns from which diagnosis is made; and, instructions related to said oscilloscope patterns directing the observer to proceed to follow alternative corrective instructions. Below the sequence indicia 2 and 3, are located complete alternative corrective instructions, as referred to by the diagnosis instructions below the sequence indicia 1.

In use of the inventive device with the instructive indicia schematically illustrated on the shell 16, it is merely necessary to first turn the body 11 so that the side of the shell 16 having the sequence indicia 1 thereon is facing the observer and then, once diagnosis has been made in accordance with the instructions on this side, to turn the body 11 so that the side of the shell labeled by the sequence indicia 2 or 3 indicated by the diagnosis is facing the observer. At this point, operation of the equipment for which the particular indicia are designed is carried out, in its entirety, simply by following the corrective instructions on the side of the shell 16 facing the observer. Ideally, these instructions are sequentially arranged as indicated at A, B and C and correlated to the equipment illustration illustrated on the side of the shell 16 headed by the sequence indiica 1.

To conclude, from the foregoing detailed description it is believed apparent that the present invention enables the accomplishment of the objects initially set forth herein. In particular, a sequential diagnosis and instruction device is provided for rapidly and effectively conveying information to the users of complex equipment.

It is to be understood that the invention is not intended to be limited to the details of the exemplary embodiment illustrated and described, but rather is defined by the accompanying claims.

What is claimed is:

1. An instruction device, comprising:
   (a) a first pyramidical shell of rigid material having an opening in the bottom thereof;
   (b) a second pyramidical shell of paper material removably received over said first shell in mating relationship with respect thereto, said second shell having an outer surface adapted to have indicia imprinted thereon;
   (c) a third pyramidical shell of transparent protective material removably received over said second shell in mating relationship with respect thereto;
   (d) a base adapted to rest in a stationary substantially horizontal condition; and,
   (e) interengageable bearing means on said base and first shell adapted to mount said shell on said base for pivotal movement about a substantially vertical axis.

2. A device according to claim 1, wherein said bearing means comrpises:
   (a) a bearing surface disposed inwardly of said first shell in vertical alignment with an opening in the bottom thereof; and,
   (b) a vertically disposed rod extending loosely through the opening in said first shell, said rod having one end fixed to said base and the other end pivotally engaged with said bearing surface.

3. A sequential diagnosis and instruction device, comprising:
   (a) a pyramidical body having a plurality of triangularly shaped outwardly facing surfaces joined at a common apex wherein, at least one of said surfaces is adapted to have disposed therein diagnostic instructions making reference to alternative corrective instructions and the remaining surfaces are each adapted to have disposed thereon alternative corrective instructions to which said diagonstic instructions make reference, said body comprising:
      (1) a first pyramidical shell of rigid material having an opening in the bottom thereof;
      (2) a second pyramidical shell of paper material removably received over said first shell in mating relationship with respect thereto, said second shell having an outer surface adapted to have imprinted thereon said diagnostic and corrective instructions; and,
      (3) a third pyramidical shell of transparent protective material removably received over said second shell in mating relationship with respect thereto;
   (b) means supporting said body for pivotal movement about a substantially vertical axis with the apex disposed at the upper extremity thereof whereby any one of said outwardly facing surfaces may be positioned to face an observer, said means comprising:
      (1) a base adapted to rest in a stationary susbtantially horizontal condition;
      (2) a bearing surface defined by the interior surface of said first shell, said bearing surface being disposed in vertical alignment with said common apex; and,
      (3) a vertically disposed rod having one end fixed to said base and the other end pivotally engaged with said bearing surface, said rod being adapted to loosely pass through the opening in the bottom of said first shell.

References Cited

UNITED STATES PATENTS

| 1,740,845 | 12/1929 | Tilbe | 40—77 X |
| 911,991 | 2/1909 | Igelstroem | 40—128 |

FOREIGN PATENTS

| 27,052 | 1912 | Great Britain. |

EUGENE R. CAPOZIO, *Primary Examiner.*

H. S. SKOGQUIST, *Examiner.*